Patented Mar. 6, 1945

2,370,669

UNITED STATES PATENT OFFICE 2,370,669

MANUFACTURE OF PLASTIC MATERIALS

Curt Boas Joseph, St. Helens, England, assignor to Pilkington Brothers Limited, Liverpool 2, England, a British company No Drawing. Application September 30, 1941, Serial No. 413,004. In Great Britain October 19, 1940

12 Claims. (Cl. 260—112)

This invention relates to a plastic material and the method of making it.

The raw material from which the plastic material is made is keratin containing material, such as hair, feathers, bristles.

When material such as hair is treated with an aqueous solution of an alkali, the keratin is dissolved, but the product obtained by precipitation on acidifying the solution is too degraded for commercial use as a plastic.

According to the invention the keratin containing material, in a finely divided state is treated with an aqueous liquid containing the hydroxide and also sulphur compounds of calcium, barium, or strontium or any mixture thereof, the sulphur compounds being sulphides, hydrosulphides and hydroxyhydrosulphides and the liquid being partly a solution and partly a suspension; the pH of the liquid is adjusted to a value only slightly above that required to effect solution of the keratin by adjusting the relative quantities of hydroxide and sulphur compound. Any undissolved material is removed from the solution and an acid solution is added to precipitate the plastic product. The precipitated product may then be washed. Water may be used, but water which is slightly acid may be employed; the pH of this washing water must be at a value not lower than that of the final pH of the mixture after precipitation.

For use, the product may be dried and ground and pressed or extruded, or it may be dissolved in an alkali and the solution used for spinning fibres, as will be well understood by those skilled in the art.

One method of carrying out the invention, using calcium salts is as follows. The dissolving liquid is prepared by passing a stream of hydrogen sulphide into a suspension of calcium hydroxide in water. As the hydrogen sulphide is absorbed by the suspension, the pH falls. If it is allowed to fall to about 11, the liquid does not appreciably dissolve the keratin. The higher the pH above 11, the more rapidly does the liquid dissolve the keratin. At a high pH, however, hydrolysis of the dissolved keratin occurs, and the eventual product is then degraded. The pH, therefore, is adjusted to a figure only a little above the minimum of 11. A pH of 12.8 has been found suitable since, then the liquid dissolves the keratin at a commercially useful rate, while hydrolysis of the keratin is very slow. This pH is reached when the ratio of the hydrogen sulphide absorbed to the calcium hydroxide is about 1 to 4. A suitable liquid is 30 grammes of calcium hydroxide in 900 c. c. of water, in which 7.5 grammes of hydrogen sulphide are absorbed. Practically useful limits of the pH are 11.5 as a low limit and 13.5 as a high limit.

The raw material is brought into a finely divided state. Thus, if hair be used, it is chopped into lengths of about one quarter inch and may be in shorter lengths with advantage. A suitable quantity for treatment by the above mentioned liquid is 100 grammes. The treatment is carried out with stirring for about 24 hours.

The solution is then filtered and acid is added to precipitate the product. By the addition of acid the pH is reduced and when it is desired to obtain the precipitate in a finely divided form the acid solution is added in such a way as to avoid local low values of the pH. It is preferred to effect the reduction gradually by adding the acid in the form of a spray, with stirring of the solution and by using a solution of, say hydrochloric acid not above normal and of keratin product solution not more than 5%. The precipitated product is then washed with water which may be acidulated.

Alternatively stronger solutions may be used with very vigorous stirring.

The dissolving liquid is most conveniently prepared in the manner described above, but may be prepared by mixing a hydroxide with a sulphide in water, the sulphide then hydrolysing to form hydrosulphide and hydroxyhydrosulphide. Or it may be prepared by direct solution of these hydrosulphides with addition of hydroxide.

The precipitation of protein products from their solutions by acid is known; any acid in which the alkaline earth salt is soluble and which does not attack the keratin product may be used, but hydrochloric acid is the most suitable acid commercially.

The product obtained by the above described process has good plastic properties comparable with those of plastic materials obtained from other proteins.

I claim:

1. Process of producing a plastic material from keratin comprising treating keratin containing material with an aqueous liquid comprising a mixture of the hydroxide, with the sulphides and hydrosulphides of an element selected from the group constituted by calcium, barium and strontium, the liquid being partly a solution and partly a suspension, adjusting the pH of the liquid to a value between 11.5 and 13.5 by adjusting the relative quantities of hydroxide and sulphur compound, removing any undissolved material from the solution, and adding to the solution an acid solution to precipitate the plastic product.

2. Process of producing a plastic material from keratin comprising treating keratin containing material with an aqueous liquid containing the hydroxide and also sulphur compounds of calcium, the sulphur compounds being sulphides, hydrosulphides and hydroxyhydrosulphides and the liquid being partly a solution and partly a suspension, adjusting the pH of the liquid to a value between 11.5 and 13.5 in order to effect solution of the keratin by adjusting the relative quantities of hydroxide and sulphur compound, removing any undissolved material from the solution, and adding to the solution an acid solution to precipitate the product.

3. Process of producing a plastic material from keratin comprising treating keratin containing material with an aqueous liquid prepared by passing hydrogen sulphide into a suspension of the hydroxide of an element selected from the group constituted by calcium, barium and strontium until the pH of the liquid has been adjusted to a value between 11.5 and 13.5, removing any undissolved material from the solution, and adding to the solution an acid solution to precipitate the plastic product.

4. Process of producing a plastic material from keratin comprising treating keratin containing material with an aqueous liquid prepared by passing hydrogen sulphide into a suspension of the hydroxides of a mixture of elements selected from the group constituted by calcium, barium and strontium until the pH of the liquid has been adjusted to a value between 11.5 and 13.5, removing any undissolved material from the solution, and adding to the solution an acid solution to precipitate the plastic product.

5. Process of producing a plastic material from keratin comprising treating keratin containing material with an aqueous liquid prepared by passing hydrogen sulphide into a suspension of calcium hydroxide until the pH of the liquid has been adjusted to a value between 11.5 and 13.5 in order to effect solution of the keratin, removing any undissolved material from the solution, and adding to the solution an acid solution to precipitate the plastic product.

6. Process of producing a plastic material from keratin consisting in treating keratin containing material with an aqueous liquid prepared by passing hydrogen sulphide into a suspension of the hydroxide of an element selected from the group constituted by calcium, barium and strontium until the pH of the liquid has been adjusted to a value between 11.5 and 13.5, removing any undissolved material from the solution, adding to the solution an acid solution to precipitate the plastic product and washing the precipitated product with acidulated water, the pH of which is at a value not lower than that of the final pH of the treating liquid after admixture with the said acid solution.

7. Process of producing a plastic material from keratin consisting in treating keratin containing material with an aqueous liquid prepared by passing hydrogen sulphide into a suspension of calcium hydroxide until the pH of the liquid has been adjusted to a value between 11.5 and 13.5 in order to effect solution of the keratin, removing any undissolved material from the solution, adding to the solution an acid solution to precipitate the plastic product and washing the precipitated product with acidulated water, the pH of which is at a value not lower than that of the final pH of the treating liquid after admixture with the said acid solution.

8. A process of producing a plastic material from keratin according to claim 1 in which the acid solution is added to the keratin product solution in such a way as to avoid local low values of the pH by gradual admixture of dilute solutions while stirring, whereby the precipitated product is obtained in a finely divided form.

9. A process of producing a plastic material from keratin according to claim 5 in which the acid solution is added to the keratin product solution in such a way as to avoid local low values of the pH by gradual admixture of dilute solutions while stirring, whereby the precipitated product is obtained in a finely divided form.

10. A process of producing a plastic material from keratin according to claim 6 in which the acid solution is added to the keratin product solution in such a way as to avoid local low values of the pH by gradual admixture of dilute solutions while stirring, whereby the precipitated product is obtained in a finely divided form.

11. A process of producing a plastic material from keratin according to claim 7 in which the acid solution is added to the keratin product solution in such a way as to avoid local low values of the pH by gradual admixture of dilute solutions while stirring, whereby the precipitated product is obtained in a finely divided form.

12. A process of producing a plastic material from keratin consisting in treating a finely divided keratin containing material with an aqueous liquid prepared by passing hydrogen sulphide into a suspension of calcium hydroxide until the pH has reached a value between 11.5 and 13.5, in order to effect solution of the keratin, removing any undissolved material from the resulting solution, adding an acid solution to the keratin product solution in such a way as to avoid local low values of the pH by gradual admixture of dilute solutions while stirring and washing the precipitated product with acidulated water, the pH of which is at a value not lower than that of the final pH of the treating liquid after admixture with the said acid solution.

CURT BOAS JOSEPH.